United States Patent [19]

Hongo et al.

[11] Patent Number: 4,944,783
[45] Date of Patent: Jul. 31, 1990

[54] METHOD FOR PRODUCING GLASS PREFORM FOR SINGLE MODE OPTICAL FIBER

[75] Inventors: Hiroyasu Hongo; Yuji Takahashi, both of Yokohama, Japan

[73] Assignee: Sumitomo Electric Industries, Ltd., Osaka, Japan

[21] Appl. No.: 281,067

[22] Filed: Dec. 8, 1988

[30] Foreign Application Priority Data

Dec. 11, 1987 [JP] Japan .................. 62-312104

[51] Int. Cl.$^5$ .............. C03B 19/06; C03B 37/07
[52] U.S. Cl. ........................ 65/3.11; 65/3.12; 65/18.2; 65/29
[58] Field of Search ............... 65/3.12, 3.11, 18.2, 65/3.2, 160, 2, 29, 162

[56] References Cited

U.S. PATENT DOCUMENTS

| | | | |
|---|---|---|---|
| 4,341,541 | 7/1982 | Dabby et al. | 65/3.12 |
| 4,345,928 | 8/1982 | Kawachi et al. | 65/18.2 |

FOREIGN PATENT DOCUMENTS

| | | | |
|---|---|---|---|
| 57-92532 | 6/1982 | Japan | 65/3.12 |
| 60-111262 | 7/1982 | Japan | 65/3.12 |
| 59-137331 | 8/1984 | Japan | 65/3.12 |
| 60-145926 | 8/1985 | Japan | 65/3.12 |
| 62-17037 | 1/1987 | Japan | 65/3.12 |

Primary Examiner—Joye L. Woodard
Attorney, Agent, or Firm—Cushman, Darby & Cushman

[57] ABSTRACT

A glass preform for use in the fabrication of a single mode optical fiber having improved dispersion property is produced by a method comprising steps of forming a porous glass cladding body around a porous glass core body to form a porous glass preform while heating the core body to partially shrink the core body with adjusting a ratio of the shrunk part of the core body to that of the unshrunk core body at a value of 0.65 to 0.9 and then heating the porous glass preform to consolidate it to obtain a transparent glass preform. Preferably, the core body is partially heated and shrunk by a cladding forming burner.

3 Claims, 3 Drawing Sheets

Raw material H₂, O₂, etc.

Raw material H₂, O₂, etc.

METHOD FOR PRODUCING GLASS PREFORM FOR SINGLE MODE OPTICAL FIBER

BACKGROUND OF THE INVENTION

1. Field of the Invention

The present invention relates to a method for producing a glass preform for use in the fabrication of a single mode optical fiber. More particularly, the present invention relates to a method for producing a glass preform under controlled process conditions to achieve a desired step type refractive index profile. A single mode optical fiber fabricated from the glass preform produced by the method of the present invention has a highly efficient dispersion property.

2. Description of the Related Art

One conventional method for producing a glass preform for an optical fiber is shown in FIG. 1. An oxyhydrogen flame is generated by a core-forming burner 4, and a glass-forming raw material such as $SiCl_4$ and $GeCl_4$ is supplied to a center part of the flame so that soot particles 6 of a glass such as $SiO_2$ and $GeO_2$ are synthesized by flame hydrolysis and/or oxidation reactions and deposited on a starting member which is rotated around and moved along its axis as glass soot is deposited to form a porous glass core body 1. In a similar manner, a porous glass cladding body 2 is formed by generating an oxyhydrogen flame by a cladding-forming burner 5 and supplying a glass-forming raw material such as $SiCl_4$ to the center part of the flame so that $SiO_2$ soot particles 7 are synthesized and deposited around the peripheral surface of the core body 1 to form a porous glass cladding body 2, whereby a porous glass preform 8 for the single mode optical fiber is produced. By dehydrating the porous glass preform 8 at a high temperature and then consolidating the dehydrated preform at a higher temperature, a transparent glass preform for the single mode optical fiber is obtained. Typically, the transparent glass preform for the single mode optical fiber produced by the above described conventional method has a refractive index profile as shown in FIG. 2.

To improve the dispersion property which is one of the transmission characteristics of the single mode optical fiber, it is desirable for the core to have a step type refractive index profile. However, as shown in FIG. 2, the conventional glass preform for the single mode optical fiber has a refractive index with an irregularity which is so-called "slope" indicated by "3" in FIG. 2.

Further, although the refractive index profile is determined during the production of the porous glass preform, there is no effective method for measuring the refractive index of the glass during the production of the porous glass preform.

One of the measures for decreasing the slope of the refractive index is described in Japanese Patent Kokai Publication No. 63-74931 (corresponding to Japanese Patent Application No. 61-216027). In this method, bulk densities of the porous glass core body and the porous glass cladding body are adjusted to desired values. Since this method achieves the desired refractive index profile by controlling the process conditions, the refractive index profile can be measured only after the porous preform is made transparent.

SUMMARY OF THE INVENTION

One object of the present invention is to provide a method for producing a glass preform for use in the fabrication of a single mode optical fiber, which can reduce the slope in the step type refractive index profile of the preform.

Another object of the present invention is to provide a method for evaluating a degree of the slope in the refractive index profile of the preform during the production of the porous glass preform.

A further object of the present invention is to provide a method for controlling the refractive index profile as desired according to the evaluated degree of the slope in the refractive index profile.

Accordingly, the present invention provides a method for producing a glass preform for use in the fabrication of a single mode optical fiber, which comprises steps of forming a porous glass cladding body around a porous glass core body to form a porous glass preform while heating the core body to partially shrink the core body and adjusting a ratio of the shrunk part of the core body (d) to that of the unshrunk core body (D) at a value of 0.65 to 0.9 and then heating the porous glass preform to consolidate it to obtain a transparent glass preform. Preferably, the core body is partially heated and shrunk by a cladding forming burner.

DETAILED DESCRIPTION OF THE DRAWINGS

Generally, the method of the present invention comprises simultaneously forming the porous glass core body and the porous glass cladding body around the core body to form the porous glass preform and then heating the porous glass preform to consolidate and/or dehydrate it to obtain the transparent glass preform. According to the present invention, during the formation of the porous glass preform, the refractive index of the porous glass is able to be evaluated and consequently the glass soot particles are deposited while controlling the refractive index of the glass.

Figure 3:
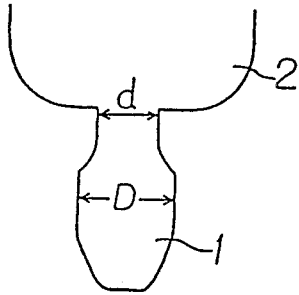
FIG. 3 is a figure showing a core shrinking factor (d/D)

It is found that, when the porous glass preform is produced, as shown in FIG. 3, at a part where the glass soot particles are steadily deposited to form a core 1 having a steady or largest diameter D, namely the core is formed with a constant diameter, a part of the core body, in which the glass soot particles are merely deposited and their cohesive force is weak so that the core body is soft, is partly shrunk to a diameter d (D>d) at a high temperature part in a temperature distribution formed by interference between the core forming burner and the cladding forming burner. As the result of the study of this phenomenon, a relationship between the diameter ratio d/D (hereinafter referred to as the "core shrinking factor") and a degree of the slope in the refractive index profile of the core has been found, and when the glass soot particles are deposited with keeping the core shrinking factor in a range between 0.9 and 0.65, a step type refractive index profile having the decreased slope is achieved.

Figure 4:
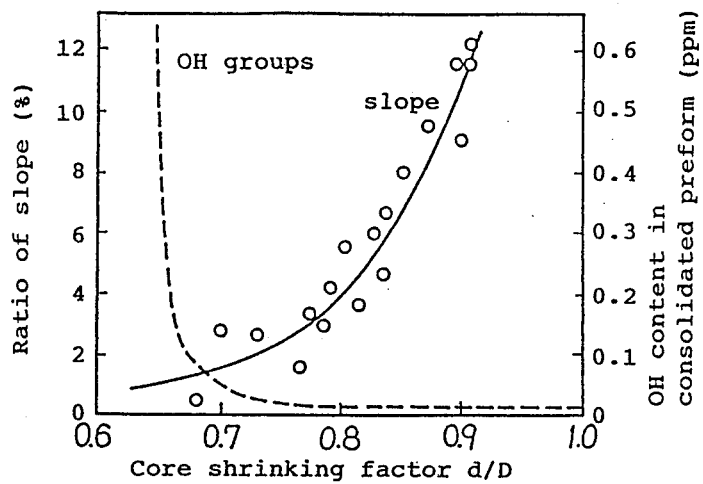
FIG. 4 is a graph showing a relationship between the core shrinking factor and the ratio of slope and a relationship between the core shrinking factor and the content of hydroxy groups in the consolidated preform.

In FIG. 4, the solid line represents the relationship between a ratio of the slope and the core shrinking factor d/D, and the broken line represents the content of hydroxyl groups in the consolidated transparent glass preform and the core shrinking factor d/D.

The ratio of the slope is defined by a ratio of an area of the slope to that of the core in the refractive index profile.

The core shrinking factor and the ratio of the slope have a relationship with a positive correlation. Therefore, to decrease the ratio of the slope, the core shrinking factor d/D should be decreased. A limitation for decreasing the core shrinking factor d/D is determined by the content of the hydroxyl groups. That is, the core shrinking factor d/D has an optimum value which is determined by the OH content in the transparent glass preform and the ratio of the slope in the refractive index profile.

Since the core shrinking factor d/D can be easily calculated by measuring the diameters d and D of the core with a commercially available telescope during the production of the porous glass preform, the refractive index profile of the preform can be identified on the spot during the process from a correlation curve such as FIG. 4 which can be prepared beforehand.

Figure 1:
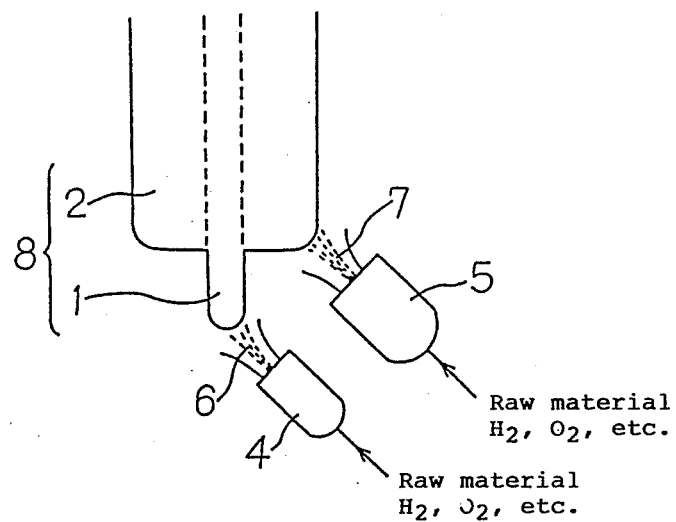
FIG. 1 schematically shows a conventional method for producing a porous glass preform for an optical fiber.

Although the core is partly shrunk by the interference between the core-forming burner and the cladding-forming burner, the cladding-forming burner having a larger flame than the core-forming burner is predominant, so that the core shrinking factor d/D can be preferably adjusted by controlling the flame generated by the cladding-forming burner. Therefore, the same burners as shown in FIG. 1 can be used in the present invention. By increasing an amount of hydrogen supplied to the cladding-forming burner to enlarge the flame or by shifting the position of the cladding-forming burner closer to the porous glass body, the temperature of the porous glass core body is raised and the core shrinking factor is decreased. On the contrary, by decreasing the amount of hydrogen supplied to the cladding-forming burner to diminish the flame or by shifting the position of the cladding-forming burner away from the porous glass preform, the temperature of the porous glass core body is lowered and the core shrinking factor is increased.

Figure 5:
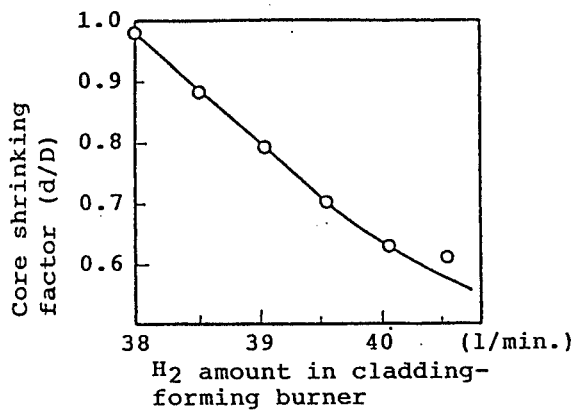
FIG. 5 is a graph showing a relationship between the core shrinking factor and the flow rate of hydrogen in the cladding-forming burner.

FIG. 5 shows an example of a relationship between the amount of hydrogen supplied to the cladding-forming burner and the core shrinking factor d/D. By establishing this relationship beforehand, the core shrinking factor can be adjusted to a desired value during the production process so that the transparent glass preform for the single mode optical fiber having a desired refractive index profile can be produced.

Although in the above description, the core body is shrunk by means of the cladding-forming burner, a third burner may be provided between the core-forming burner and the cladding-forming burner to partially shrink the core body. In addition, a plurality of core-forming burners or cladding-forming burners may be used.

As the glass-forming raw material, any compound which is used in the VAD method can be used in the present invention. Examples of the raw material are $SiCl_4$, $SiHCl_3$ and the like. As a fuel gas, hydrogen gas, natural gas, petroleum gas and the like can be used. As a combustion improving gas, oxygen, air and the like are exemplified. As an inert gas, argon, helium, nitrogen and the like can be used.

Figure 2:
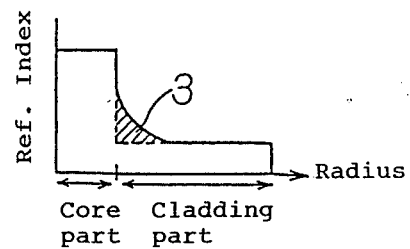
FIG. 2 shows a refractive index profile in a core part of a glass preform produced by the conventional method.

The reason why the slope in the refractive index profile can be decreased by depositing the glass soot particles while adjusting the core shrinking factor in a range from 0.9 to 0.65 has not been made clear but may be assumed is as follows:

During heating and consolidating the porous glass preform, dissipation of $GeO_2$ and the like contained in the porous glass core body starts and continues till the consolidation of the porous glass core body is finalized. If the core shrinking factor exceeds 0.9, the amount of dissipated $GeO_2$ and the like abruptly increases when the consolidation is almost finished, that is when the heated part of the preform is still porous and its temperature is raised. Since the consolidation of the porous preform proceeds from the peripheral part to the inner part, the dissipated $GeO_2$ and the like are diffused in and trapped by the cladding part which is just before the consolidation. But, since the amount of the dissipated $GeO_2$ and like is smaller at the peripheral part, the trapped amount is also smaller. Therefore, the amount of $GeO_2$ and the like trapped by the cladding part increases towards the core part. As a result, the glass preform for the single mode optical fiber produced by the conventional method has a slope in a refractive index profile in a radial direction as shown in FIG. 2. and in turn deteriorated dispersion property.

Figure 6:
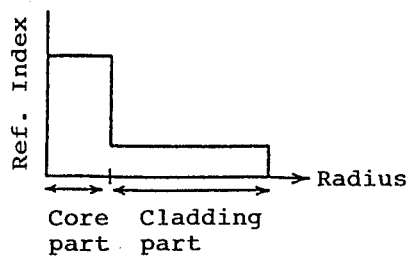
FIG. 6 shows a refractive index profile in a core part of a glass preform produced by the method of the present invention.

When the core shrinking factor is smaller than 0.9, the peripheral part of the porous glass core body is consolidated faster than the cladding part around the core part. Therefore, $GeO_2$ and like dissipated from the center part of the core part are shielded by the consolidated peripheral part of the core body and are not dissipated in the radial direction. As a result, $GeO_2$ and like dissipated from the porous glass core body do not diffuse into the cladding part just around the core part. Thereby, the slope in the refractive index profile is diminished and a refractive index profile similar to FIG. 6 is obtained.

If the core shrinking factor is smaller than 0.65, dehydration treatment with $Cl_2$ and the like is prevented because movability of $Cl_2$ and $H_2O$ through the shrunk cladding part is almost suppressed.

Figure 7:
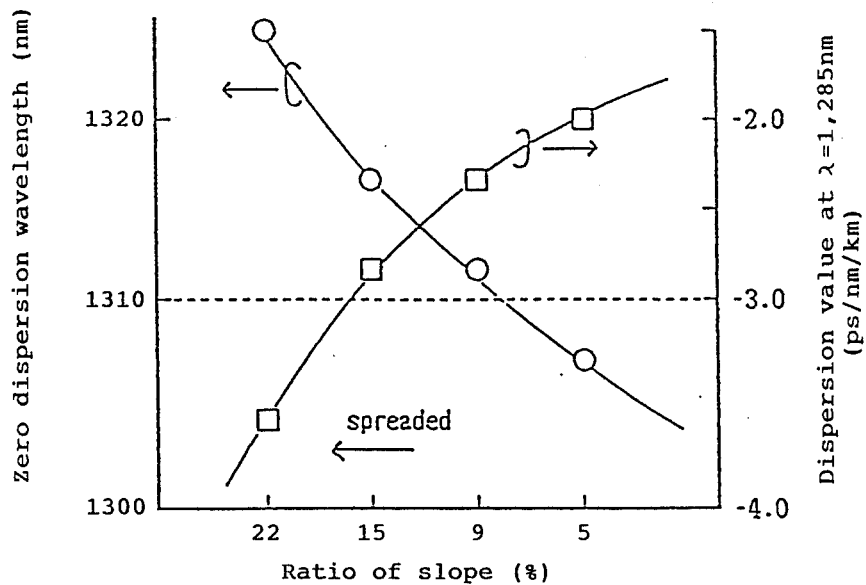
FIG. 7 shows a relationship between the ratio of the slope in the refractive index profile and the dispersion characteristics.

A relationship between the ratio of slope and the dispersion characteristics can be numerically calculated by the finite element method. A result is shown in FIG. 7.

In the case of the single mode optical fiber, light to be propagated therethrough as a signal has a wavelength of 1,300 nm. Therefore, a zero dispersion wavelength at which the dispersion becomes zero is preferably close to 1,300 nm. However, in designing the optical fiber, the zero dispersion wavelength is usually set higher than 1,300 nm in view of other specifications of the optical fiber. As understood from FIG. 7, to make the zero dispersion wavelength closer to 1,300 nm, the ratio of slope should be small. The right side axis of the ordinate axis indicates the dispersion value. The dispersion value closer to zero is better. From the above analysis, it is understood that the smaller ratio of slope is advantageous to achieve the better dispersion characteristics.

PREFERRED EMBODIMENTS OF THE INVENTION

The present invention will be illustrated by the following Examples.

COMPARATIVE EXAMPLE

By means of burners as shown in FIG. 1 and at gas flow rates in Table 1, a porous glass preform was produced by the conventional method and heated and consolidated to produce a transparent glass preform. The preform had a refractive index profile as shown in FIG. 2.

EXAMPLE

In the same manner as in the Comparative Example but increasing the flow rate of hydrogen from the burner 5 to enlarge the flame generated by the burner 5, the surface of the produced porous glass core body was heated by the burner 5 to shrink the core body and the transparent glass preform was produced according to the present invention. The preferable flow rate was chosen as the shrinking value reached the specified value while observing the diameters of the shrunk and unshrunk parts of the core body with a telescope in the initial stage of the porous glass production. The preform had a refractive index profile as shown in FIG. 6.

TABLE 1

| Burner | Gas | Example | Comp. Example |
|---|---|---|---|
| Core-forming burner | $SiCl_4$ | 117 SCCM | 78 SCCM |
| | $GeCl_4$ | 5 SCCM | 6 SCCM |
| | $H_2$ | 3.3 SLM | 2.7 SLM |
| | $O_2$ | 7.0 SLM | 7.0 SLM |
| | Ar | 3.1 SLM | 3.4 SLM |
| Cladding-forming burner | $SiCl_4$ | 887 SCCM | 1,358 SCCM |
| | $H_2$ | 39 SLM | 44 SLM |
| | $O_2$ | 46 SLM | 22 SLM |
| | Ar | 14 SLM | 6 SLM |

In the Example, plural transparent glass preforms were produced by changing the flow rate of hydrogen in the cladding-forming burner to vary the core shrinking factor d/D. The variation of the core shrinking factor with the change of the flow rate of hydrogen is shown in FIG. 5. Further, with the plural transparent preforms having varying core shrinking factors d/D, a ratio of slope in the refractive index profile and the OH group contents in the preforms were measured, and their relationships with the core shrinking factor are plotted as shown in FIG. 4. From FIG. 4, it is understood that, when the core shrinking factor is not larger than 0.9, the ratio of slope can be made sufficiently small, and when the core shrinking factor is less than 0.65, the dehydration effect of $Cl_2$ during consolidation is suppressed. From FIG. 5, it is understood that the control of the flow rate of hydrogen in the cladding-forming burner can adjust the core shrinking factor. Finally, from FIG. 6, the transparent preform produced by the method of the present invention has a refractive index profile with no slope as designed and is better than the preform produced by the conventional preform having the refractive index profile as shown in FIG. 2.

What is claimed is:

1. A method for producing a glass preform for use in the fabrication of a single mode optical fiber, which comprises steps of:

forming a porous core body and a porous cladding body simultaneously while heating a part of the porous core body to partially shrink the core body so that a ratio of a diameter of the shrunk part of the core body to that of the unshrunk part of the core body is adjusted in the range between 0.65 and 0.9 by measuring the diameters of the shrunk part and the unshrunk part of the core body, calculating a ratio of the diameter of the shrunk part of the core body to that of the unshrunk part of the core body and adjusting a heating degree of the part of the core body to be shrunk so that said ratio of the diameters is in said range through adjustment of temperature at the part of the core body, and then heating the porous glass preform to consolidate it to obtain a transparent glass preform.

2. The method according to claim 1, wherein the core body is formed with a core forming burner and the cladding body is formed with at least one cladding forming burner, a portion of the heat generated by the cladding forming burner being utilized to shrink the part of the core body.

3. The method according to claim 2, wherein the core body is partially shrunk with an additional burner which is independent from the core forming burner and the cladding forming burner.

* * * * *